US012576813B2

(12) United States Patent　　　　　(10) Patent No.:　US 12,576,813 B2
Okuma et al.　　　　　　　　　　　　　(45) Date of Patent:　　Mar. 17, 2026

(54) VEHICLE HEADLAMP WITH OPTICAL DEFLECTION

(71) Applicant: STANLEY ELECTRIC CO., LTD., Tokyo (JP)

(72) Inventors: Hiroaki Okuma, Tokyo (JP); Yusuke Shibata, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/923,215

(22) Filed: Oct. 22, 2024

(65) Prior Publication Data

US 2025/0128677 A1　　Apr. 24, 2025

(30) Foreign Application Priority Data

Oct. 23, 2023　(JP) ................................. 2023-182094

(51) Int. Cl.
| | |
|---|---|
| *B60S 1/02* | (2006.01) |
| *B60Q 1/04* | (2006.01) |
| *F21S 41/25* | (2018.01) |
| *F21S 45/60* | (2018.01) |

(52) U.S. Cl.
CPC ................ *B60S 1/023* (2013.01); *B60Q 1/04* (2013.01); *F21S 41/25* (2018.01); *F21S 45/60* (2018.01)

(58) Field of Classification Search
CPC . F21S 45/60; F21S 41/13; F21S 41/25; B60S 1/023; B60Q 1/04
See application file for complete search history.

(56) References Cited

U.S. PATENT DOCUMENTS

| | | | | |
|---|---|---|---|---|
| 9,869,446 B2 * | 1/2018 | Kim | ........................ | F21S 45/49 |
| 2007/0025105 A1 * | 2/2007 | Inoue | ....................... | F21S 45/48 |
| | | | | 362/249.07 |

FOREIGN PATENT DOCUMENTS

| | | | | |
|---|---|---|---|---|
| DE | 102006033750 A1 * | 1/2008 | .............. | B60S 1/603 |
| DE | 102014110841 B4 * | 8/2024 | ................ | F21V 7/28 |
| JP | 2008-021601 A | 1/2008 | | |

* cited by examiner

*Primary Examiner* — Robert J May
(74) *Attorney, Agent, or Firm* — Kenealy Vaidya LLP

(57)　　　　　　　　ABSTRACT

To provide a vehicle headlamp that can remove, without using a heater, fogging adhering to an outer lens. A vehicle headlamp includes a housing, an outer lens attached to the housing to form a lamp chamber between the outer lens and the housing, a lighting fixture unit configured to emit visible light that transmits through a visible light transmission region of the outer lens, the lighting fixture unit being disposed in the lamp chamber, an optical probe apparatus configured to emit infrared light that transmits through an infrared light transmission region of the outer lens, the optical probe apparatus being disposed in the lamp chamber, and an infrared light control unit configured to control the infrared light, which is emitted from the optical probe apparatus, such that the infrared light emitted from the optical probe apparatus is radiated to the visible light transmission region of the outer lens.

11 Claims, 7 Drawing Sheets

VEHICLE HEADLAMP WITH OPTICAL DEFLECTION

INCORPORATION BY REFERENCE

This application is based upon and claims the benefit of priority from Japanese patent application No. 2023-182094, filed on Oct. 23, 2023, the disclosure of which is incorporated herein in its entirety by reference.

BACKGROUND

The present disclosure relates to a vehicle headlamp. There is a known vehicle lighting fixture in which wire heaters are provided in a lamp chamber to remove fogging adhering to an outer lens, the lamp chamber being formed between a housing and the outer lens, which is attached to the housing (see Patent Literature 1, for example).

Patent Literature 1: Japanese Unexamined Patent Application Publication No. 2008-21601

SUMMARY

However, the vehicle lighting fixture described in Patent Literature 1 has a problem that the inside of the lamp chamber reaches a higher temperature than necessary due to the wire heaters.

The present disclosure has been made to solve such a problem, and it is an object of the present disclosure to provide a vehicle headlamp that can remove, without using a heater, fogging adhering to an outer lens.

A vehicle headlamp according to the present disclosure includes: a housing; an outer lens attached to the housing to form a lamp chamber between the outer lens and the housing; a lighting fixture unit configured to emit visible light that transmits through a visible light transmission region of the outer lens, the lighting fixture unit being disposed in the lamp chamber; an optical probe apparatus configured to emit infrared light that transmits through an infrared light transmission region of the outer lens, the optical probe apparatus being disposed in the lamp chamber; and an infrared light control unit configured to control the infrared light, which is emitted from the optical probe apparatus, such that the infrared light emitted from the optical probe apparatus is radiated to the visible light transmission region of the outer lens.

With such a configuration, it is possible to remove, without using a heater, fogging adhering to the outer lens.

This can be achieved because an infrared light control unit (an optical deflection element and an optical deflection element drive mechanism, for example) is provided that controls infrared light, which is emitted from the optical probe apparatus, such that the infrared light emitted from the optical probe apparatus is radiated to the visible light transmission region of the outer lens.

In the vehicle headlamp described above, the infrared light control unit may include an optical deflection element and an optical deflection element drive mechanism, the optical deflection element may be configured to deflect the infrared light to cause the infrared light deflected to be radiated to the visible light transmission region of the outer lens, the infrared light being emitted from the optical probe apparatus and being incident on the optical deflection element, and the optical deflection element drive mechanism may cause the optical deflection element to be disposed at an infrared light incident position or an infrared light non-incident position, the infrared light incident position being located on an optical path of the infrared light emitted from the optical probe apparatus, the infrared light non-incident position being located outside the optical path of the infrared light emitted from the optical probe apparatus.

In the vehicle headlamp described above, when the optical deflection element is disposed at the infrared light non-incident position, the optical probe apparatus may emit the infrared light by applying a first driving voltage, and when the optical deflection element is disposed at the infrared light incident position, the optical probe apparatus may emit the infrared light by applying a second drive voltage which is higher than the first drive voltage.

In the vehicle headlamp described above, the vehicle headlamp may further include a fogging detection unit configured to perform a fogging detection process of detecting fogging adhering to the outer lens, wherein when the fogging is detected, the optical deflection element drive mechanism may cause the optical deflection element to be disposed at the infrared light incident position, whereas when no fogging is detected, the optical deflection element drive mechanism may cause the optical deflection element to be disposed at the infrared light non-incident position.

In the vehicle headlamp described above, a wavelength of the infrared light may be a wavelength selected from 895 nm to 960 nm and 1350 nm to 1550 nm.

In the vehicle headlamp described above, the optical probe apparatus may include a semiconductor light emitting element configured to emit the infrared light, and the semiconductor light emitting element may be any one of a stripe LD, a VCSEL, and a PCSEL.

In the vehicle headlamp described above, the vehicle headlamp may further include a bracket to which the lighting fixture unit is attached; and an optical axis adjusting mechanism configured to adjust an optical axis of the lighting fixture unit by tilting the bracket, wherein the optical probe apparatus may be attached to the bracket.

The present disclosure can provide a vehicle headlamp that can remove, without using a heater, fogging adhering to the outer lens.

The above and other objects, features and advantages of the present disclosure will become more fully understood from the detailed description given hereinbelow and the accompanying drawings.

DESCRIPTION OF EMBODIMENTS

Hereinafter, a vehicle headlamp 10 being an embodiment of the present disclosure will be described with reference to attached drawings. In the respective drawings, corresponding constitutional elements are given the same reference symbols, and repeated description will be omitted.

Figure 1:
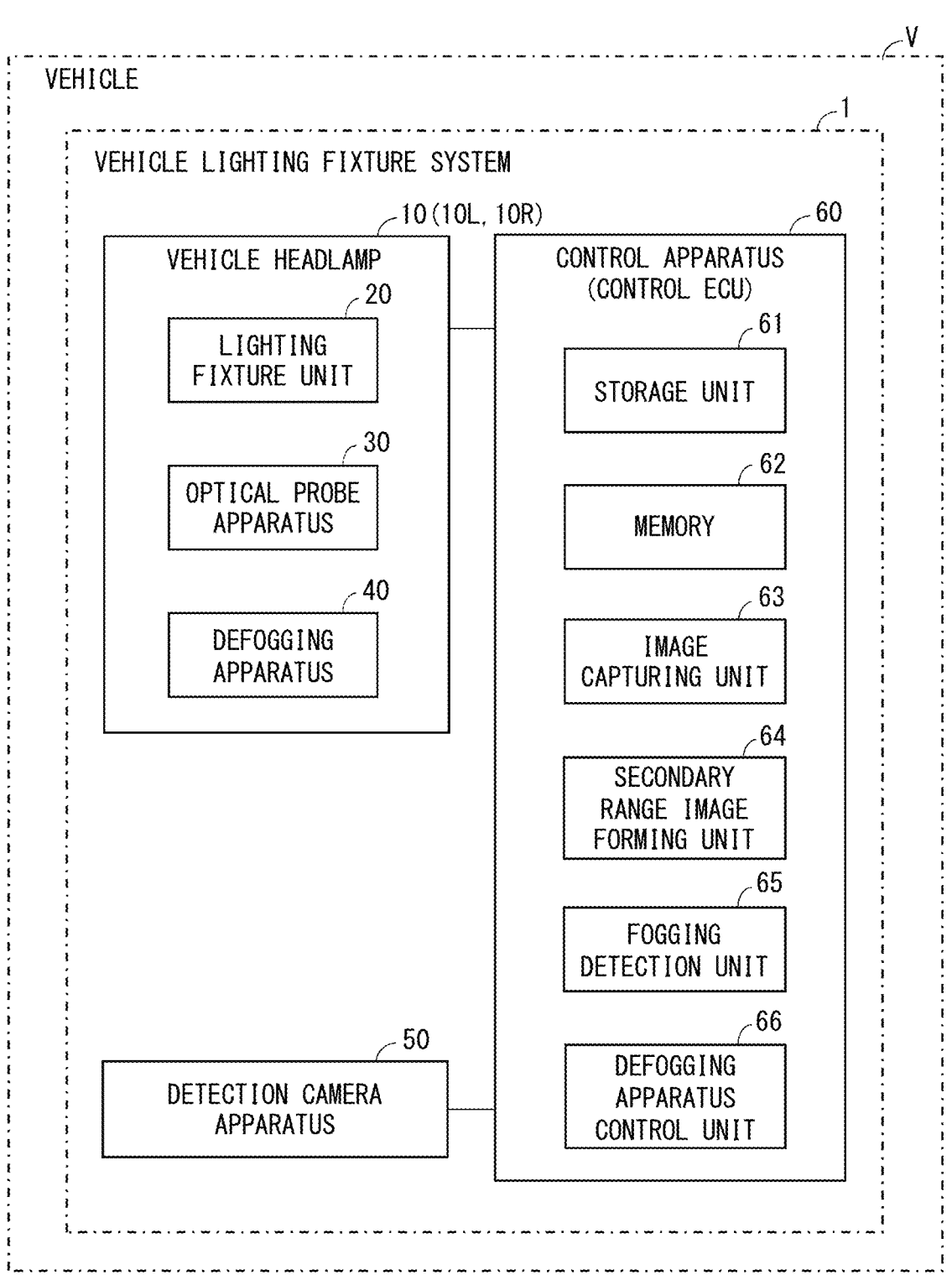
FIG. 1 is a schematic configuration diagram of a vehicle lighting fixture system 1 including vehicle headlamps 10 of an embodiment.

FIG. 1 is a schematic configuration diagram of a vehicle lighting fixture system 1 including the vehicle headlamps 10 of the embodiment.

As shown in FIG. 1, the vehicle lighting fixture system 1 includes the vehicle headlamps 10 (10L, 10R), a detection camera apparatus 50, and a control apparatus 60. The vehicle lighting fixture system 1 is mounted on a vehicle V, such as an automobile.

Figure 2:
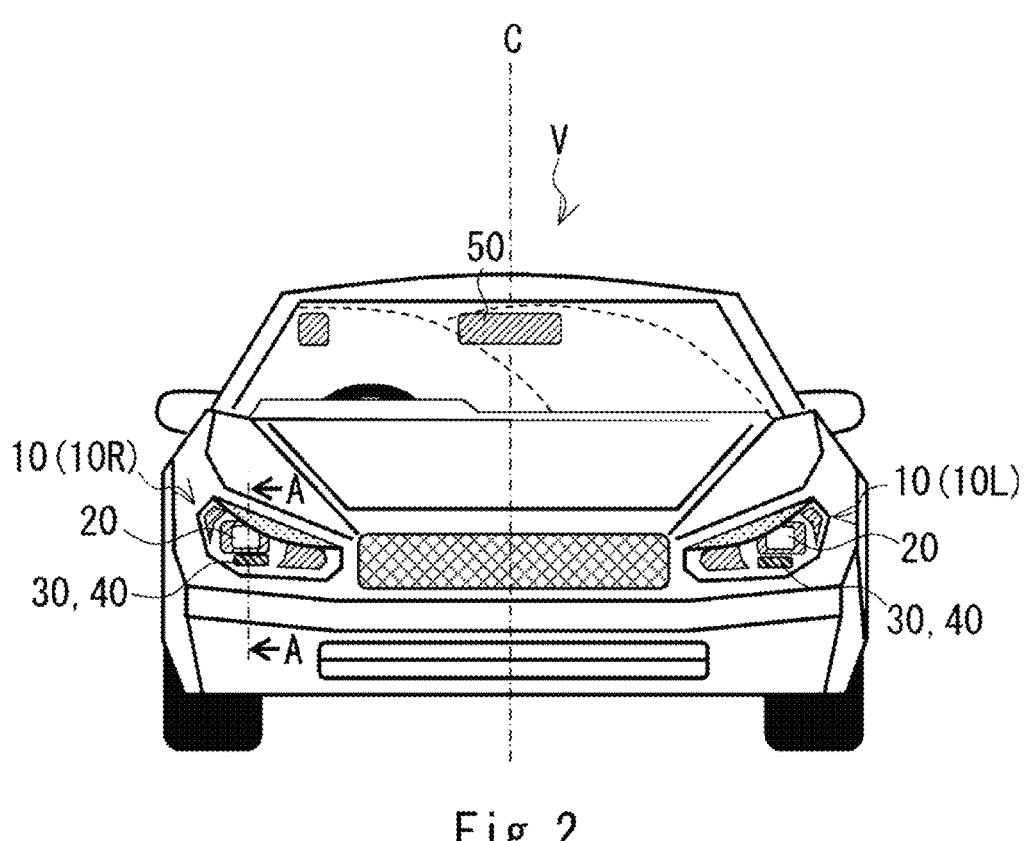
FIG. 2 is a front view of a vehicle V on which the vehicle lighting fixture system 1 is mounted.

FIG. 2 is a front view of the vehicle V on which the vehicle lighting fixture system 1 is mounted.

As shown in FIG. 2, the vehicle headlamps 10 (10L, 10R) are provided to both left and right sides of the front end portion of the vehicle V.

Figure 3A:
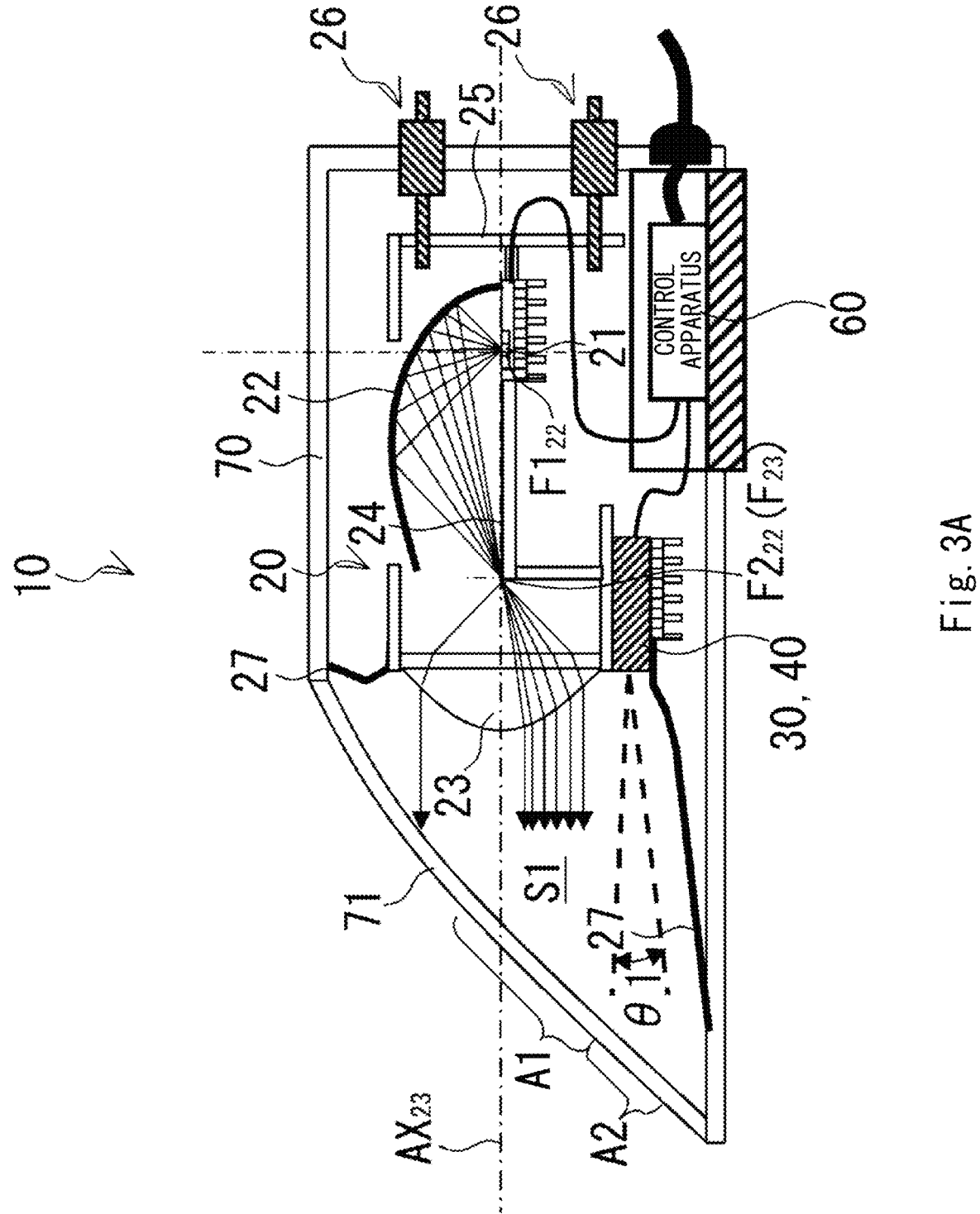
FIG. 3A is a cross-sectional view taken along A-A in FIG. 2.
Figure 3B:
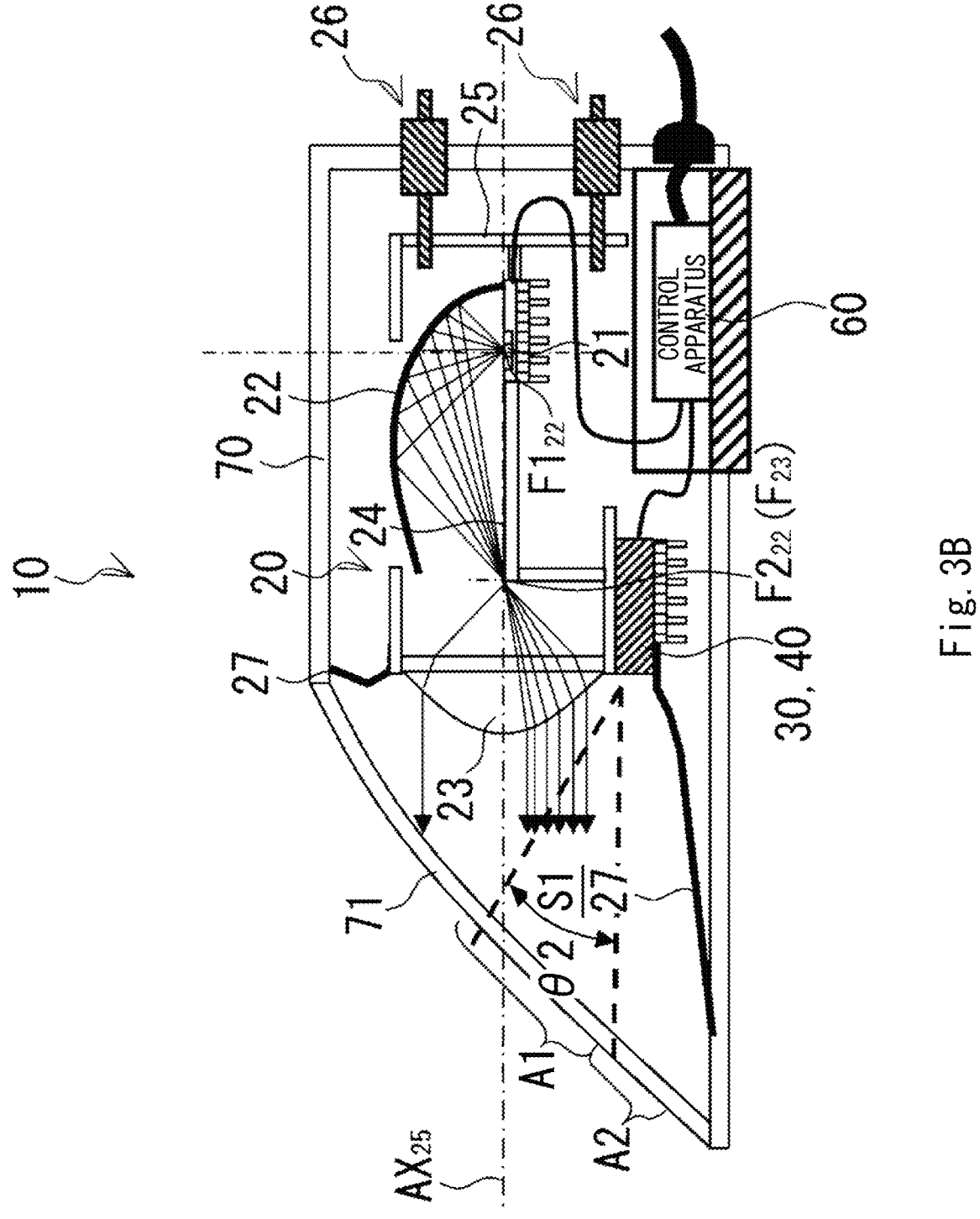
FIG. 3B is a cross-sectional view taken along A-A in FIG. 2.

FIG. 3A and FIG. 3B are cross-sectional views taken along A-A in FIG. 2.

As shown in FIG. 1 and FIG. 3A, each vehicle headlamp 10 includes a lighting fixture unit 20, an optical probe apparatus 30, and a defogging apparatus 40 (one example of an infrared light control unit in the present disclosure). The optical probe apparatus 30 and the detection camera apparatus 50 form a LiDAR apparatus. The lighting fixture unit 20, the optical probe apparatus 30, and the defogging apparatus 40 are disposed in a lamp chamber S1 formed between a housing 70 and an outer lens 71 attached to the housing 70.

First, the constitutional example of the lighting fixture unit 20 will be described. Hereinafter, an example in which the lighting fixture unit 20 is a projector type lighting fixture unit will be described.

As shown in FIG. 3, the lighting fixture unit 20 includes a semiconductor light emitting element 21, a reflection surface 22 (reflector), a projection lens 23, a reflection surface 24 (serving as both a shade and a mirror), a bracket 25, optical axis adjusting mechanisms 26, and an extension 27.

The semiconductor light emitting element 21 is a white LED light source, for example. The white LED light source has a light emitting surface (1 mm square, for example). The semiconductor light emitting element 21 is disposed in the vicinity of a first focal point $F1_{22}$ of the reflection surface 22, with the light emitting surface of the semiconductor light emitting element 21 directed upward.

The reflection surface 22 is a spheroidal reflection surface, and has the first focal point $F1_{22}$ and a second focal point $F2_{22}$, the first focal point $F1_{22}$ being located at a rear part of the vehicle, the second focal point $F2_{22}$ being located at a front part of the vehicle. The reflection surface 22 is disposed in a state of covering the semiconductor light emitting element 21 (light emitting surface) such that light emitted from the semiconductor light emitting element 21 is incident on the reflection surface 22.

The projection lens 23 is disposed in front of the reflection surface 22 with a focal point $F_{23}$ (rear focal point) of the projection lens 23 located in the vicinity of the second focal point $F2_{22}$ of the reflection surface 22. The projection lens 23 causes a light source image to be inverted and projected toward the front direction of the vehicle, the light source image being formed on a focal plane, which contains the focal point $F_{23}$, by a reflected light from the reflection surface 22.

The reflection surface 24 (serving as both a shade and a mirror) is a planar-shaped reflection surface which has a front end edge disposed in the vicinity of the focal point $F_{23}$ of the projection lens 23, and which extends horizontally toward the rear side of the vehicle (toward the semiconductor light emitting element 21) from the front end edge. The front end edge of the reflection surface 24 includes a cutoff shape (Z-shaped step part) (not shown in the drawing) corresponding to a cutoff line being the upper end edge of a low-beam light distribution pattern.

The semiconductor light emitting element 21, the reflection surface 22, the projection lens 23, and the reflection surface 24 (serving as both a shade and a mirror) having the above-mentioned configurations are attached to the bracket 25.

The bracket 25 is attached to the housing 70 in a state of being tiltable in the vertical direction and the lateral direction. In contrast, the optical axis adjusting mechanisms 26 are aiming screws, for example, and are attached to the housing 70 in a state of being rotatable at the same positions. The distal end portions of the aiming screws are screwed into the bracket 25. Accordingly, by adjusting the screwing amounts of the aiming screws with respect to the bracket 25 by rotating the aiming screws, the bracket 25 tilts in the vertical direction and the lateral direction corresponding to the screwing amounts. Consequently, it is possible to adjust the optical axis of the lighting fixture unit 20 (it is possible to perform leveling, for example).

Figure 4:
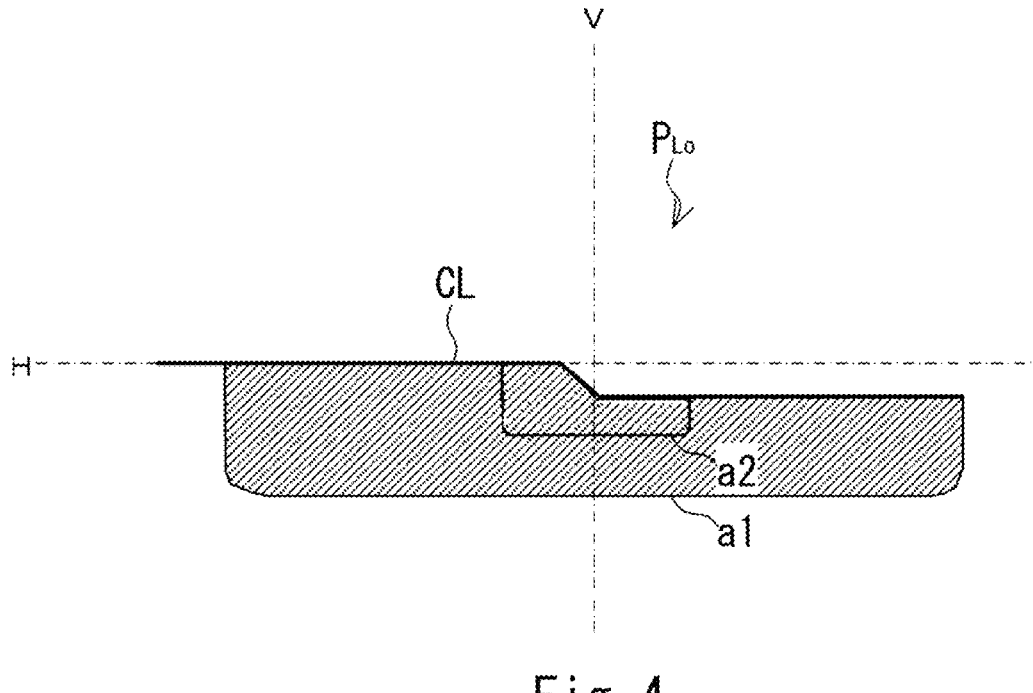
FIG. 4 shows one example of a low-beam light distribution pattern $P_{Lo}$ formed on a virtual vertical screen (disposed at a position approximately 25 m in front of a vehicle front surface) which faces the vehicle front surface.

In the vehicle headlamp 10 having the above-mentioned configuration, a low-beam light distribution pattern $P_{Lo}$ can be formed by turning on the semiconductor light emitting element 21. FIG. 4 shows one example of the low-beam light distribution pattern $P_{Lo}$ formed on a virtual vertical screen (disposed at a position approximately 25 m in front of the vehicle front surface) which faces the vehicle front surface.

In the lighting fixture unit 20 having the above-mentioned configuration, when the semiconductor light emitting element 21 is turned on, light emitted from the semiconductor light emitting element 21 is reflected on the reflection surface 22, is directed toward the focal point $F_{23}$ of the projection lens 23, and is condensed at a position close to an optical axis $AX_{23}$ of the projection lens 23. Thereafter, the light is emitted from the projection lens 23 together with reflected light which is further reflected (turned back and reflected) by the reflection surface 24 (serving as both a shade and a mirror), and then transmits through a visible light transmission region A1 of the outer lens 71 (see FIG. 3A), thus being radiated forward.

Due to such light (visible light) transmitting through the outer lens 71 (visible light transmission region A1) and radiated forward, the low-beam light distribution pattern $P_{Lo}$ is formed as shown in FIG. 4. This low-beam light distribution pattern $P_{Lo}$ is excellent in distant visibility that allows relatively high brightness in a region in the vicinity of a cutoff line CL and in a region in the vicinity of the point of intersection between the H line and the V line.

The visible light transmission region A1 refers to a region, in the outer lens 71, through which light emitted from the lighting fixture unit 20 transmits. Light emitted from the lighting fixture unit 20 may be light for forming the entire low-beam light distribution pattern PLO (see a region indicated by reference symbol a1 in FIG. 4), or may be light for forming a portion of the low-beam light distribution pattern $P_{Lo}$ (see a high luminous intensity region having a relatively high luminous intensity and indicated by reference symbol a2 in FIG. 4).

Next, the constitutional example of the optical probe apparatus 30 will be described.

Figures 5A, 5B, 5C:
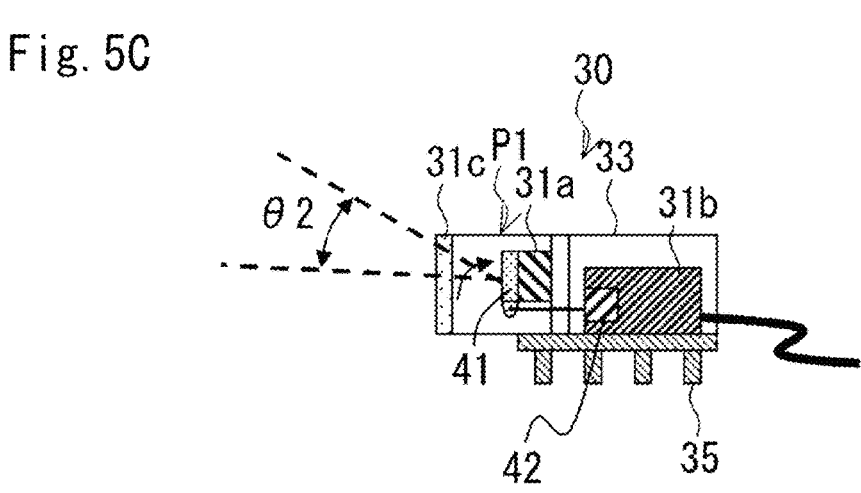
FIG. 5A is a schematic configuration diagram of an optical probe apparatus 30.
FIG. 5B is a cross-sectional view taken along B-B in FIG. 5A.
FIG. 5C is a cross-sectional view taken along B-B in FIG. 5A.

FIG. 5A is a schematic configuration diagram of the optical probe apparatus 30, and FIG. 5B is a cross-sectional view taken along B-B in FIG. 5A.

As shown in FIG. 5A and FIG. 5B, the optical probe apparatus 30 includes a light source system module 31 and a light receiving system module 32. The light source system module 31 and the light receiving system module 32 are housed in a housing 33 having a light shielding property.

The light source system module 31 emits infrared light having wavelengths in the infrared regions of the solar-blind band to a measurement target region located in front of the vehicle V. The infrared regions of the solar-blind band are 895 nm to 915 nm and 1350 nm to 1550 nm, for example. The wavelengths in the infrared regions of the solar-blind band are wavelengths selected from the infrared regions of the solar-blind band, and are 905 nm, 940 nm, and 1450 nm, for example. In contrast, the light receiving system module 32 receives reflected light (visible light), and outputs an electric signal corresponding to the received reflected light, the reflected light being light emitted from the lighting fixture unit 20 (projection lens 23), and then returned due to reflection (scattering) on fogging adhering to the inner side of the outer lens 71. The light source system module 31 and the light receiving system module 32 serve as fogging detection sensors that detect fogging adhering to the inner side of the outer lens 71.

The light source system module 31 includes a light source element 31a, an oscillation circuit 31b, and a light-emitting window 31c.

The light source element 31a includes a semiconductor laser (semiconductor light emitting element) and a diffractive optical element (DOE), the semiconductor laser emitting (oscillating) infrared light having wavelengths in the infrared regions of the solar-blind band, the diffractive optical element converting infrared light emitted from the semiconductor laser into a predetermined dotted beam pattern. The semiconductor laser is a vertical cavity surface emitting laser (VCSEL) including an emitter that emits a plurality of laser beams (24×64), for example. The diffractive optical element is formed by a multi-bend cell array, for example, and performs multiple branching of infrared light (laser beam) emitted from the emitter of the VCSEL. The semiconductor laser is not limited to the VCSEL, and may be a stripe laser diode (LD) or a photonic crystal surface emitting laser (PCSEL). The dotted beam pattern may be formed by a turning mirror (a MEMS mirror, a galvano mirror, or a polygon mirror) instead of the diffractive optical element.

The oscillation circuit 31b turns on or off the light source element 31a in a predetermined pattern (pulse oscillation) in response to a control signal from the control apparatus 60 (ECU: electronic control unit).

The light-emitting window 31c is formed by a filter (a low pass filter, for example) that allows transmission of infrared light emitted from the light source element 31a (diffraction optical grating), and that blocks external light.

The light receiving system module 32 includes a light receiving element 32a, a detection circuit 32b, and a light receiving window 32c.

The light receiving element 32a (four deflection light receiving elements) receives reflected light (visible light), and then outputs an electric signal corresponding to the received reflected light, the reflected light being light emitted from the lighting fixture unit 20 (projection lens 23), and then returned due to reflection (scattering) on the inner side of the outer lens 71 (visible light transmission region A1) or fogging adhering to the inner side.

The detection circuit 32b is a circuit that converts the electric signal outputted from the light receiving element 32a into an electric signal that can be recognized by the control apparatus 60 (fogging detection unit 65) disposed downstream of the detection circuit 32b, and that sends the converted electric signal to the control apparatus 60.

The light receiving window 32c is formed by a filter (band pass filter) that allows transmission of reflected light (infrared light), and that blocks external light unnecessary for detection, the reflected light being light emitted from the lighting fixture unit 20 (projection lens 23), and then returned due to reflection (scattering) on the inner side of the outer lens 71 (visible light transmission region A1) or fogging adhering to the inner side.

In the optical probe apparatus 30 having the above-mentioned configuration, infrared light emitted from the optical probe apparatus 30 (light source element 31a) is converted, by the diffractive optical element, into a laser beam group forming a dot pattern in the measurement target region, and then transmits through an infrared light transmission region A2 of the outer lens 71 (see FIG. 3A), thus being radiated forward. An angle θ1 in FIG. 3A indicates a range of infrared light emitted from the optical probe apparatus 30 (light source element 31a) and transmitting through the infrared light transmission region A2 of the outer lens 71 (see FIG. 3A).

Next, the constitutional example of the defogging apparatus 40 will be described.

In the vehicle headlamp 10 having the above-mentioned configuration, when the outer lens 71 is cooled by rain or the like, dew condensation is generated, so that the inner side of the outer lens 71 is fogged. When the inner side of the outer lens 71 is fogged, the amount of light (visible light), being emitted from the lighting fixture unit 20, that transmits through the outer lens 71 (visible light transmission region A1) is decreased and hence, it is desired to remove fogging adhering to the inner side of the outer lens 71. The defogging apparatus 40 is used to remove this fogging adhering to the inner side of the outer lens 71.

As shown in FIG. 5A and FIG. 5B, the defogging apparatus 40 includes an optical deflection element 41 and an optical deflection element drive mechanism 42. The optical deflection element 41 and the optical deflection element drive mechanism 42 are housed in the housing 33 together with the optical probe apparatus 30, the housing 33 having light shielding property.

The optical deflection element 41 is configured to deflect infrared light (a laser beam group forming a dot pattern in the measurement target region) to cause the infrared light deflected to be radiated to the visible light transmission region A1 of the outer lens 71, the infrared light being emitted from the optical probe apparatus 30 and being incident on the optical deflection element 41. To be more specific, the optical deflection element 41 is a diffuser.

The optical deflection element drive mechanism 42 is an actuator that causes the optical deflection element 41 to be disposed at an infrared light incident position P1 (see FIG. 5C) or at an infrared light non-incident position P2 (see FIG. 5B), the infrared light incident position P1 being located on the optical path of infrared light emitted from the optical probe apparatus 30, the infrared light non-incident position P2 being located outside the optical path of infrared light emitted from the optical probe apparatus 30.

In the defogging apparatus 40 having the above-mentioned configuration, when the optical deflection element 41 is disposed at the infrared light incident position P1 (see FIG. 5C), infrared light (a laser beam group forming a dot pattern in the measurement target region) emitted from the optical probe apparatus 30 is deflected by the optical deflection element 41, thus being radiated to the visible light transmission region A1 of the outer lens 71. In such a case, infrared light is easily absorbed by water and hence, the infrared light (the laser beam group forming the dot pattern in the measurement target region) emitted from the optical probe apparatus 30 and deflected by the optical deflection element 41 is absorbed by fogging (water drops) adhering to the inner side of the outer lens 71 (visible light transmission region A1), thus heating the fogging (water drops). Consequently, the fogging (water drops) adhering to the inner side of the outer lens 71 (visible light transmission region A1) evaporates. As a result, it is possible to remove the fogging (water drops) adhering to the inner side of the outer lens 71 (visible light transmission region A1). The range of the wavelengths of infrared light emitted from the optical probe apparatus 30 is preferably either 895 nm to 915 nm or 1350 nm to 1550 nm. Alternatively, the range may be 915 nm to 960 nm in which an infrared semiconductor light emitting element (infrared laser) has a high light output, 915 nm to 960 nm being the limits of the absorption band.

In contrast, when the optical deflection element 41 is disposed at the infrared light non-incident position P2 (see FIG. 5B), infrared light (a laser beam group forming a dot pattern in the measurement target region) emitted from the optical probe apparatus 30 transmits through the outer lens 71 (infrared light transmission region A2) without being deflected by the optical deflection element 41, thus being radiated toward the measurement target region. Consequently, it is possible to perform sensing of an object present in the measurement target region.

The optical probe apparatus 30 and the defogging apparatus 40 (housing 33) having the above-mentioned configurations are attached to the bracket 25. By attaching, in this manner, the optical probe apparatus 30 and the defogging apparatus 40 (housing 33) to the bracket 25, which is tiltable in the vertical direction and the lateral direction by the optical axis adjusting mechanisms 26, it is possible to adjust the optical axis of infrared light (a laser beam group forming a dot pattern in the measurement target region) emitted from the optical probe apparatus 30, together with the adjustment of the optical axis of the lighting fixture unit 20 performed by the optical axis adjusting mechanisms 26.

Next, the detection camera apparatus 50 will be described.

The detection camera apparatus 50 includes an image capturing element (not shown in the drawing). The detection camera apparatus 50 performs image capturing of (receives) return light by the image capturing element to form a range image, pixel values of which are taken as the distance value, the return light being light emitted from the optical probe apparatus 30 and then reflected on an object present in the measurement target region. As shown in FIG. 2, the detection camera apparatus 50 is provided in the cabin of the vehicle V at the center in the vehicle width direction. The detection camera apparatus 50 performs image capturing of an area in front of the vehicle V through the windscreen (in the wiper sweep area).

The image capturing element is, for example, a single photon counting type image capturing element (SPAD: single photon avalanche diode) that can measure time of flight of infrared light emitted from the optical probe apparatus 30 (direct ToF). Alternatively, a charge distribution type image capturing element may also be used that obtains a distance to a detection object by detecting a phase shift of the optical probe apparatus 30 (indirect ToF).

Next, the control apparatus 60 (control ECU) will be described.

As shown in FIG. 1, the control apparatus 60 (control ECU: electronic control unit) includes, for example, a processor (not shown in the drawing), a storage unit 61, and a memory 62.

The processor is a central processing unit (CPU), for example. One processor may be used, or a plurality of processors may be used. By executing a predetermined program (not shown in the drawing) read into the memory 62 (a RAM, for example) from the storage unit 61 (a ROM, for example), the processor serves as an image capturing unit 63, a secondary range image forming unit 64, the fogging detection unit 65, and a defogging apparatus control unit 66. Some or all of these functions may be achieved by hardware.

The image capturing unit 63 performs image capturing of a right range image and a left range image, being primary range images, by controlling the optical probe apparatuses 30 and the detection camera apparatus 50. For example, the image capturing unit 63 causes the optical probe apparatuses 30 to be turned on at a predetermined light emission timing, and causes the detection camera apparatus 50 to perform image capturing at a predetermined timing. The right range image is a range image image-captured by the optical probe apparatus 30 which is provided on the right side of the front end portion of the vehicle V (the right side in the direction toward the vehicle front side). In contrast, the left range image is a range image image-captured by the optical probe apparatus 30 which is provided on the left side of the front end portion of the vehicle V (the left side in the direction toward the vehicle front side).

The secondary range image forming unit 64 forms a secondary range image based on the right range image and the left range image, being primary range images sent from the detection camera apparatus 50. The secondary range image formed by the secondary range image forming unit 64 is, for example, a synthesized range image obtained by synthesizing the right range image and the left range image.

The fogging detection unit 65 performs a fogging detection process. The fogging detection process is a process of detecting fogging adhering to the inner side of the outer lens 71, based on the output from the light receiving system module 32 (light receiving element 32a). For example, the fogging detection process is a process of comparing the output from the light receiving system module 32 (light receiving element 32a) with the threshold value (stored in the storage unit 61, for example) to determine whether the output from the light receiving system module 32 (light receiving element 32a) is more than the threshold value. When the output from the light receiving system module 32 (light receiving element 32a) is more than the threshold value, the fogging detection unit 65 detects fogging adhering to the inner side of the outer lens 71. In contrast, when the output from the light receiving system module 32 (light receiving element 32a) is not more than the threshold value, the fogging detection unit 65 does not detect fogging adhering to the inner side of the outer lens 71.

The defogging apparatus control unit 66 controls the optical deflection element drive mechanism 42 (actuator) such that the optical deflection element 41 is disposed at the infrared light incident position P1 (see FIG. 5C) or the infrared light non-incident position P2 (see FIG. 5B), the infrared light incident position P1 being located on the optical path of infrared light emitted from the optical probe apparatus 30, the infrared light non-incident position P2 being located outside the optical path of infrared light emitted from the optical probe apparatus 30. For example, when fogging adhering to the inner side of the outer lens 71 is detected, the defogging apparatus control unit 66 controls the optical deflection element drive mechanism 42 (actuator) such that the optical deflection element 41 is disposed at the infrared light incident position P1 (see FIG. 5C) located on the optical path of infrared light emitted from the optical probe apparatus 30. In contrast, when fogging adhering to the inner side of the outer lens 71 is not detected, the defogging apparatus control unit 66 controls the optical deflection element drive mechanism 42 (actuator) such that the optical deflection element 41 is disposed at the infrared light non-incident position P2 (see FIG. 5B) located outside the optical path of infrared light emitted from the optical probe apparatus 30.

Next, the operation example of the vehicle lighting fixture system 1 having the above-mentioned configuration will be described.

Figure 6:
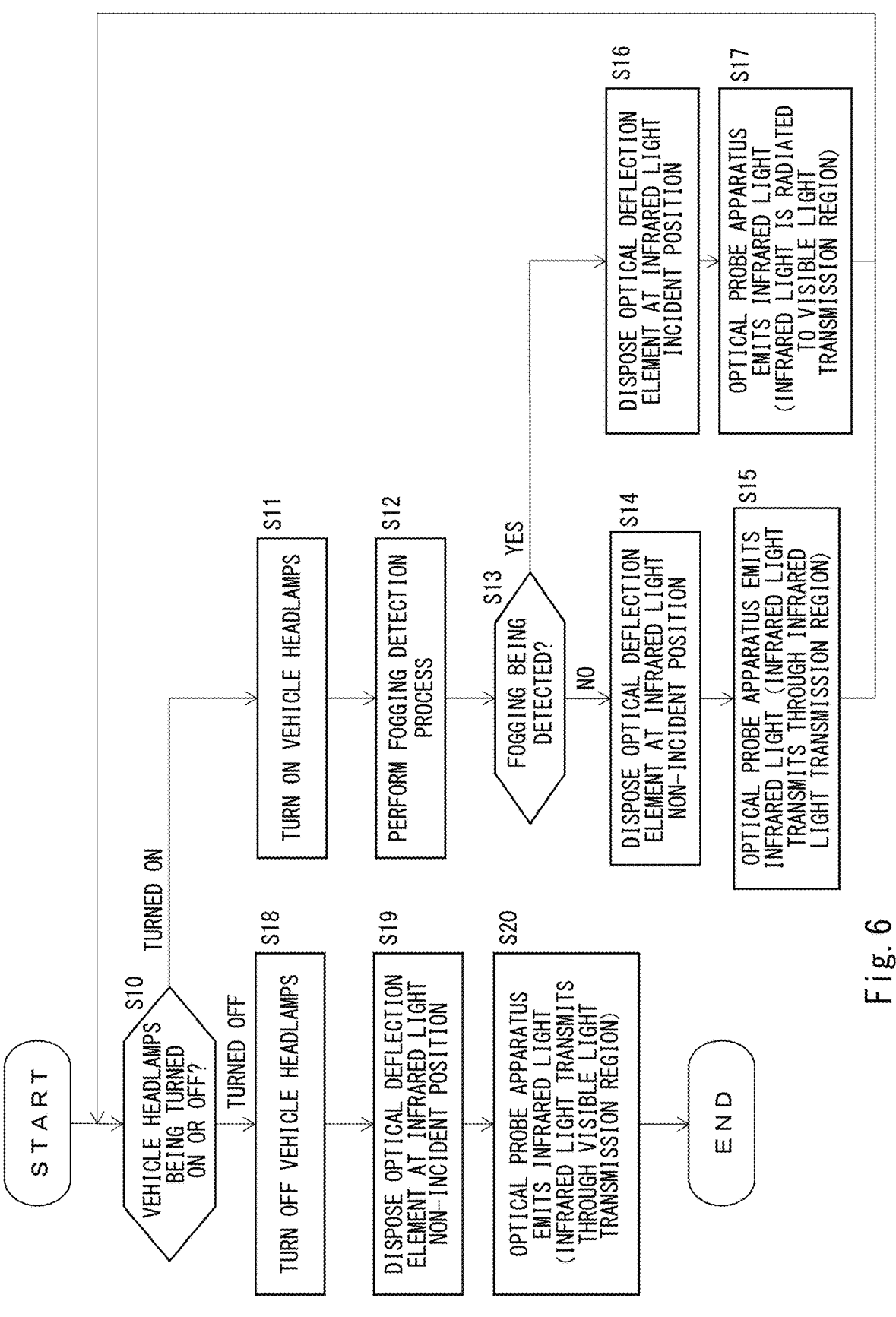
FIG. 6 is a flowchart of an operation example of the vehicle lighting fixture system 1.

FIG. 6 is a flowchart of the operation example of the vehicle lighting fixture system 1.

First, it is determined whether the vehicle headlamps 10 are instructed to be turned on or off (instructed by the user, for example) (step S10). This can be achieved by the control apparatus 60 performing a predetermined program, for example.

Next, when the determination result in step S10 is "turned on" (step S10: turned on), the vehicle headlamps 10 (semiconductor light emitting elements 21) are turned on (step S11). This can be achieved by the control apparatus 60 performing a predetermined program, for example.

Next, a fogging detection process is performed (step S12). This can be achieved by the fogging detection unit 65. The fogging detection unit 65 compares the output from each light receiving system module 32 (light receiving element 32a) with the threshold value (stored in the storage unit 61, for example) and, when the output from the light receiving system module 32 (light receiving element 32a) is more than the threshold value, the fogging detection unit 65 detects fogging adhering to the inner side of the outer lens 71. In contrast, when the output from the light receiving system module 32 (light receiving element 32a) is not more than the threshold value, the fogging detection unit 65 does not detect fogging adhering to the inner side of the outer lens 71.

Next, when fogging is not detected as a result of step S12 (step S13: No), the optical deflection element 41 is disposed at the infrared light non-incident position P2 (see FIG. 5B) (step S14). This can be achieved by the defogging apparatus control unit 66. The defogging apparatus control unit 66 controls the optical deflection element drive mechanism 42 (actuator) such that the optical deflection element 41 is disposed at the infrared light non-incident position P2 (see FIG. 5B) located outside the optical path of infrared light emitted from the optical probe apparatus 30.

Next, the optical probe apparatus 30 emits infrared light (step S15). At this point of operation, the optical deflection element 41 is disposed at the infrared light non-incident position P2 (see FIG. 5B) (see step S14) and hence, infrared light (a laser beam group forming a dot pattern in the measurement target region) emitted from the optical probe apparatus 30 transmits through the outer lens 71 (infrared light transmission region A2) without being deflected by the optical deflection element 41, thus being radiated toward the measurement target region. The angle θ1 in FIG. 3A and FIG. 5B indicates the range of infrared light emitted from the optical probe apparatus 30 (light source element 31a) and transmitting through the infrared light transmission region A2 of the outer lens 71 (see FIG. 3A). Consequently, it is possible to perform sensing of an object present in the measurement target region. In step S15, a first drive voltage is applied to the light source element 31a (semiconductor laser) of the optical probe apparatus 30 by PWM control, the first drive voltage corresponding to a period of 1 μs and a pulse width of 10 ns, for example.

In contrast, when fogging is detected as a result of step S12 (step S13: YES), the optical deflection element 41 is disposed at the infrared light incident position P1 (see FIG. 5C) (step S16). This can be achieved by the defogging apparatus control unit 66. The defogging apparatus control unit 66 controls the optical deflection element drive mechanism 42 (actuator) such that the optical deflection element 41 is disposed at the infrared light incident position P1 (see FIG. 5C) located on the optical path of infrared light emitted from the optical probe apparatus 30.

Next, the optical probe apparatus 30 emits infrared light (step S17). At this point of operation, the optical deflection element 41 is disposed at the infrared light incident position P1 (see FIG. 5C) (see step S16) and hence, infrared light (a laser beam group forming a dot pattern in the measurement target region) emitted from the optical probe apparatus 30 is deflected by the optical deflection element 41, thus being radiated to the visible light transmission region A1 of the outer lens 71. An angle θ2 in FIG. 3B and FIG. 5C indicates a range of infrared light emitted from the optical probe apparatus 30 (light source element 31a) and radiated to the visible light transmission region A1 of the outer lens 71 (see FIG. 3B). In such a case, infrared light is easily absorbed by water and hence, the infrared light (the laser beam group forming the dot pattern in the measurement target region) emitted from the optical probe apparatus 30 and deflected by the optical deflection element 41 is absorbed by fogging (water drops) adhering to the inner side of the outer lens 71 (visible light transmission region A1), thus heating the fogging (water drops). Consequently, the fogging (water drops) adhering to the inner side of the outer lens 71 (visible light transmission region A1) evaporates. As a result, it is possible to remove the fogging (water drops) adhering to the inner side of the outer lens 71 (visible light transmission region A1).

In step S17, a second drive voltage (effective voltage) which is higher than the above-mentioned first drive voltage (effective voltage) is applied to the light source element 31a (semiconductor laser) of the optical probe apparatus 30 by PWM control, the second drive voltage corresponding to a duty ratio of 1/10 to 1/100, for example. Consequently, compared with the case in which the above-mentioned first drive voltage (effective voltage) is applied, the intensity of infrared light radiated to the visible light transmission region A1 of the outer lens 71 is increased. Consequently, evaporation of fogging (water drops) adhering to the inner side of the outer lens 71 (visible light transmission region A1) is promoted. As a result, it is possible to quickly remove fogging (water drops) adhering to the inner side of the outer lens 71 (visible light transmission region A1).

Thereafter, processes in the above-mentioned respective steps are repeatedly performed until fogging is no longer detected in step S13.

In contrast, when the determination result in step S10 is "turned off" (step S10: turned off), the vehicle headlamps 10 (semiconductor light emitting elements 21) are turned off (step S18). This can be achieved by the control apparatus 60 performing a predetermined program, for example.

Next, the optical deflection element 41 is disposed at the infrared light non-incident position P2 (see FIG. 5B) (step S19). This can be achieved by the defogging apparatus control unit 66. The defogging apparatus control unit 66 controls the optical deflection element drive mechanism 42 (actuator) such that the optical deflection element 41 is disposed at the infrared light non-incident position P2 (see FIG. 5B) located outside the optical path of infrared light emitted from the optical probe apparatus 30.

Next, the optical probe apparatus 30 emits infrared light (step S20). At this point of operation, the optical deflection element 41 is disposed at the infrared light non-incident position P2 (see FIG. 5B) (see step S19) and hence, infrared light (a laser beam group forming a dot pattern in the measurement target region) emitted from the optical probe apparatus 30 transmits through the outer lens 71 (infrared light transmission region A2) without being deflected by the optical deflection element 41, thus being radiated toward the measurement target region. The angle θ1 in FIG. 3A and FIG. 5B indicates the range of infrared light emitted from the optical probe apparatus 30 (light source element 31a) and transmitting through the infrared light transmission region A2 of the outer lens 71 (see FIG. 3A). Consequently, it is possible to perform sensing of an object present in the measurement target region. In step S20, the first drive voltage is applied to the light source element 31a (semiconductor laser) of the optical probe apparatus 30 by PWM control, the first drive voltage corresponding to a period of 1 μs and a pulse width of 10 ns, for example.

As has been described above, according to the present embodiment, it is possible to remove, without using a heater, fogging adhering to the outer lens 71.

This can be achieved because the infrared light control unit (the optical deflection element and the optical deflection element drive mechanism, for example) is provided that controls infrared light, which is emitted from the optical probe apparatus, such that the infrared light emitted from the optical probe apparatus 30 is radiated to the visible light transmission region of the outer lens.

Next, a modified example will be described.

In the above-mentioned embodiment, the description has been made for the example that uses the projector type lighting fixture unit as the lighting fixture unit 20. However, the configuration is not limited to such a configuration. That is, a lighting fixture unit having any configuration may be used provided that the lighting fixture unit emits light (visible light) that transmits through the outer lens 71 (visible light transmission region A1) to form a light distribution pattern for a headlamp (for example, a low-beam light distribution pattern, a high-beam light distribution pattern, or a light distribution pattern for an adaptive driving beam system (ADB)). For example, for the lighting fixture unit 20, a lighting fixture unit different from the projector type lighting fixture unit may be used, such as a reflector type lighting fixture unit, a direct projection type (so-called direct-projection type) lighting fixture unit, a lighting fixture unit that uses a light guide body (a light guide rod or a light guide plate, for example), or lighting fixture units other than the above.

In the above-mentioned embodiment, the example has been described in which the defogging apparatus 40 causes the optical deflection element 41 to be disposed at the infrared light incident position P1 (see FIG. 5C) or the infrared light non-incident position P2 (see FIG. 5B), the infrared light incident position P1 being located on the optical path of infrared light emitted from the optical probe apparatus 30, the infrared light non-incident position P2 being located outside the optical path of infrared light emitted from the optical probe apparatus 30. However, the configuration is not limited to such a configuration. For example, the defogging apparatus 40 may cause the optical deflection element 41 to be disposed at an infrared light incident position or an infrared light non-incident position, the infrared light incident position being located on the optical path of infrared light emitted from an infrared light emitting apparatus that is different from the optical probe apparatus 30 (for example, various infrared light emitting apparatuses, such as a LiDAR sensor, used in a LiDAR apparatus), the infrared light non-incident position being located outside the optical path of infrared light emitted from the infrared light emitting apparatus.

All of the respective numerical values shown in the above-mentioned respective embodiments are examples and, needless to say, it is possible to use suitable numerical values different from the respective numerical values shown in the above-mentioned respective embodiments.

The above-mentioned respective embodiments are merely examples in all aspects. The present disclosure should not be construed as limited by description of the above-mentioned respective embodiments. The present disclosure can be embodied in other various forms without departing from the spirit and essential characteristics thereof.

What is claimed is:

1. A vehicle headlamp comprising:
a housing;
an outer lens attached to the housing to form a lamp chamber between the outer lens and the housing;
a lighting fixture unit configured to emit visible light that transmits through a visible light transmission region of the outer lens, the lighting fixture unit being disposed in the lamp chamber;
an optical probe apparatus configured to emit infrared light that transmits through an infrared light transmission region of the outer lens, the optical probe apparatus being disposed in the lamp chamber; and
an infrared light control unit configured to control the infrared light, which is emitted from the optical probe apparatus, such that the infrared light emitted from the optical probe apparatus is radiated to the visible light transmission region of the outer lens wherein
the infrared light control unit includes an optical deflection element and an optical deflection element drive mechanism,
the optical deflection element is configured to deflect the infrared light to cause the infrared light deflected to be radiated to the visible light transmission region of the outer lens, the infrared light being emitted from the optical probe apparatus and being incident on the optical deflection element, and
the optical deflection element drive mechanism causes the optical deflection element to be disposed at an infrared light incident position or an infrared light non-incident position, the infrared light incident position being located on an optical path of the infrared light emitted from the optical probe apparatus, the infrared light non-incident position being located outside the optical path of the infrared light emitted from the optical probe apparatus.

2. The vehicle headlamp according to claim 1, wherein when the optical deflection element is disposed at the infrared light non-incident position, the optical probe apparatus emits the infrared light by applying a first driving voltage, and when the optical deflection element is disposed at the infrared light incident position, the optical probe apparatus emits the infrared light by applying a second drive voltage which is higher than the first drive voltage.

3. The vehicle headlamp according to claim 1, further comprising a fogging detection unit configured to perform a fogging detection process of detecting fogging adhering to the outer lens, wherein when the fogging is detected, the optical deflection element drive mechanism causes the optical deflection element to be disposed at the infrared light incident position, whereas when no fogging is detected, the optical deflection element drive mechanism causes the optical deflection element to be disposed at the infrared light non-incident position.

4. The vehicle headlamp according to claim 1, wherein a wavelength of the infrared light is a wavelength selected from 895 nm to 960 nm and 1350 nm to 1550 nm.

5. The vehicle headlamp according to claim 1, wherein the optical probe apparatus includes a semiconductor light emitting element configured to emit the infrared light, and the semiconductor light emitting element is any one of a stripe LD, a VCSEL, and a PCSEL.

6. The vehicle headlamp according to claim 1, further comprising:

a bracket to which the lighting fixture unit is attached; and an optical axis adjusting mechanism configured to adjust an optical axis of the lighting fixture unit by tilting the bracket, wherein the optical probe apparatus is attached to the bracket.

7. The vehicle headlamp according to claim 1, wherein the optical probe apparatus includes a light source system module configured to emit infrared light and a light receiving system module, the light receiving system module includes a light receiving element that receives reflected light of visible light emitted from the lighting fixture unit and reflected by the outer lens.

8. The vehicle headlamp according to claim 7, further comprising:

a fogging detection unit configured to detect fogging of the outer lens based on an output of the light receiving element, when the fogging is detected, the optical deflection element controls infrared light emitted from the optical probe apparatus so that the infrared light irradiates a visible light transmission region.

9. A vehicle lighting fixture system comprising:

a vehicle headlamp according to claim 1; and a detection camera apparatus that captures, by an image capturing element, return light emitted from the optical probe apparatus and reflected on an object present in a measurement target region.

10. A vehicle headlamp comprising:

a housing;

an outer lens attached to the housing to form a lamp chamber between the outer lens and the housing;

a lighting fixture unit configured to emit visible light that transmits through a visible light transmission region of the outer lens, the lighting fixture unit being disposed in the lamp chamber;

an infrared light emitting apparatus configured to emit infrared light that transmits through an infrared light transmission region of the outer lens, the infrared light emitting apparatus being disposed in the lamp chamber; and an infrared light control unit configured to control the infrared light, which is emitted from the infrared light emitting apparatus, such that the infrared light emitted from the infrared light emitting apparatus is radiated to the visible light transmission region of the outer lens wherein the infrared light control unit includes an optical deflection element and an optical deflection element drive mechanism, the optical deflection element is configured to deflect the infrared light to cause the infrared light deflected to be radiated to the visible light transmission region of the outer lens, the infrared light being emitted from the infrared light emitting apparatus and being incident on the optical deflection element, and the optical deflection element drive mechanism causes the optical deflection element to be disposed at an infrared light incident position or an infrared light non-incident position, the infrared light incident position being located on an optical path of the infrared light emitted from the infrared light emitting apparatus, the infrared light non-incident position being located outside the optical path of the infrared light emitted from the infrared light emitting apparatus.

11. The vehicle headlamp according to claim 10, wherein the infrared light emitting apparatus is a LiDAR sensor used in a LiDAR apparatus.

\* \* \* \* \*